(12) United States Patent
Krauss (10) Patent No.: US 7,698,690 B2
(45) Date of Patent: Apr. 13, 2010

(54) IDENTIFYING CODE THAT WASTES TIME PERFORMING REDUNDANT COMPUTATION

(75) Inventor: Kirk J. Krauss, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 990 days.

(21) Appl. No.: 11/164,105

(22) Filed: Nov. 10, 2005

(65) Prior Publication Data
US 2007/0169051 A1 Jul. 19, 2007

(51) Int. Cl.
G06F 9/44 (2006.01)
G06F 9/45 (2006.01)

(52) U.S. Cl. .............. 717/127; 717/128; 717/130; 717/131; 717/158

(58) Field of Classification Search ........... 717/127, 717/128, 130, 131, 158
See application file for complete search history.

(56) References Cited

U.S. PATENT DOCUMENTS

| | | | | |
|---|---|---|---|---|
| 5,339,431 A * | 8/1994 | Rupp et al. | | 717/162 |
| 5,347,654 A * | 9/1994 | Sabot et al. | | 717/151 |
| 6,243,864 B1 * | 6/2001 | Odani et al. | | 717/154 |
| 6,397,379 B1 * | 5/2002 | Yates et al. | | 717/140 |
| 6,681,387 B1 * | 1/2004 | Hwu et al. | | 717/158 |
| 6,745,384 B1 * | 6/2004 | Biggerstaff | | 717/156 |
| 7,111,290 B1 * | 9/2006 | Yates et al. | | 717/158 |
| 7,373,637 B2 * | 5/2008 | DeWitt et al. | | 717/131 |
| 2001/0054165 A1 * | 12/2001 | Ono | | 714/718 |
| 2003/0023961 A1 * | 1/2003 | Barsness et al. | | 717/152 |
| 2007/0118832 A1 * | 5/2007 | Huelsbergen | | 717/151 |

OTHER PUBLICATIONS

Wu, et al. "Exposing Memory Access Regularities Using Object-Relative Memory Profiling", 2004, IEEE, p. 1-9.*
Garigipati, et al. "Evaluating the use of Profiling by a Region-based Register Allocator", 2001, ACM, p. 953-957.*

* cited by examiner

Primary Examiner—Wei Y Zhen
Assistant Examiner—Qamrun Nahar
(74) Attorney, Agent, or Firm—Cuenot, Forsythe & Kim, LLC (57) ABSTRACT

A method of runtime analysis of a computer program can include, after each access of a first type to a memory address, incrementing a counter associated with the memory address and, after each access of a second type to a memory address, comparing the counter associated with the memory address with a threshold. The method further can include identifying at least one memory address having a counter that exceeds the threshold and determining a portion of code responsible for accessing the memory address associated with the counter that exceeds the threshold.

20 Claims, 6 Drawing Sheets

IDENTIFYING CODE THAT WASTES TIME PERFORMING REDUNDANT COMPUTATION

FIELD OF THE INVENTION

The present invention relates to the field of software development and, more particularly, to software development tools for performing runtime analysis on computer programs.

DESCRIPTION OF THE RELATED ART

Application developers generally try to write efficient computer program code. Inefficient computer program code can suffer a decrease in performance in that the execution time of the resulting program typically increases. One type of inefficiency found in computer program code is referred to as redundancy. While some redundancy is regarded as a normal aspect of application development, other forms of redundancy are not. For example, computer program code responsible for functions such as loop control, memory block initialization, and the like, require a certain degree of redundancy to function properly. This redundancy is regarded as necessary and useful.

By comparison, redundancy in computer program code that is not necessary is regarded as useless. Useless redundancy can, and often does, result in degraded program performance as noted above. Detecting instances in which computer program code is responsible for performing useless redundant computation, however, can be difficult. This is particularly true with modern computer programs that rely upon complex relationships among threads and functions that may, and often do, share common computing resources.

Presently, useless redundancy of the sort described herein cannot be corrected in an automatic fashion through the use of improved compilation. It would be beneficial to provide a mechanism and/or technique for identifying instances of useless redundancy and/or unnecessary computation within computer program code.

SUMMARY OF THE INVENTION

The embodiments disclosed herein provide methods and articles of manufacture relating to the identification of portions of code of a computer program that are responsible for unnecessary computation. One embodiment of the present invention can include a method of runtime analysis of a computer program. The method can include incrementing a counter associated with a memory address after each access of a first type to the memory address and comparing the count of the counter associated with the memory address with a threshold value and resetting the counter after each access of a second type to the memory address. The count of the counter represents a count of consecutive accesses of the first type prior to an access of the second type. The method further can include determining the count of the counter associated with the memory address exceeds the threshold value, determining a portion of code of the computer program that is responsible for accessing the memory address associated with the counter that exceeds the threshold value, and designating the portion of code as responsible for redundant accesses to the memory address.

Another embodiment of the present invention can include a method of runtime analysis of a computer program. The method can include comparing a value previously stored in a memory address with a value that is written to the memory address for each write access to the memory address, and if the value previously stored is a same value as the value that is written, incrementing a counter associated with the memory address. The count of the counter represents a count of consecutive write accesses of the same value to the memory address. The method further can include determining a portion of code of the computer program that is responsible for accessing the memory address having an associated counter that conforms with an established criterion, and designating the portion of code as responsible for redundant write accesses to the memory address.

Another embodiment of the present invention can include a machine readable storage, having stored thereon, a computer program having a plurality of code sections executable by a machine for causing the machine to perform the various steps and methods disclosed herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein provide a solution for detecting redundant, also referred to as useless, computation performed by computer program code. More particularly, the embodiments disclosed herein can detect instances in which memory locations are needlessly read and/or written. In general, the embodiments discussed herein track read and write accesses to memory locations performed by a computer program during runtime. The records of the read and/or write accesses can be analyzed to determine which portions of the computer program code are responsible for one or more instances of redundant computation and/or processing.

There are several possible indicators of computational redundancy. As noted, some of these indicators involve accesses to memory. The term "access", as used herein, can refer to either a read operation involving a memory address and/or a write operation involving a memory address. In any case, examples of redundant and/or useless computations that involve memory can include, but are not limited to, repeated writes to a memory address involving unchanging values that are stored in the memory address, multiple writes to a memory address with no intervening reads from that memory address, and/or repeated reads from a memory address that involve unchanging values.

The various functions described herein can be implemented using a software analysis tool. In one embodiment, for example, the various functions described herein can be implemented as extensions of one or more members of the Rational PurifyPlus family of software analysis tools which are commercially available from International Business Machines Corporation of Armonk, N.Y. (IBM). PurifyPlus is a family of computer programs that provides runtime analysis functionality to software developers and testers. In general, runtime analysis refers to the practice of understanding application behavior using data collected during execution of the application, also referred to as the computer program under test.

The present invention further can include functionality for generating call graphs via runtime analysis. A tool called Quantify, for example, which is a member of the PurifyPlus product family, can produce call graphs for a computer program under test. In general, a call graph refers to a diagram that identifies the functions, methods, and/or modules in a system or computer program and shows which functions, methods, and/or modules invoke one another. A call graph also can be referred to as a call tree or a tier chart, which comprises nodes representing various portions of computer code, i.e. functions, methods, and/or modules.

The products discussed within this specification are intended to provide a basis for teaching one skilled in the art to better understand the embodiments disclosed herein. As such, it should be appreciated that the embodiments disclosed herein can be implemented as a standalone application, as a component or "plug-in" that is used as part of a larger application, or in virtually any appropriately detailed structure, computer program, and/or portion thereof.

In any case, using the runtime analysis tool, records of memory address accesses can be collected and reviewed to identify unnecessary computational redundancy. The records, referred to as redundancy records, can be maintained and/or stored along with call chain information to indicate the particular computer program code responsible for the unnecessary memory address access(es). As used herein, a redundancy record is a collection of one or more attributes that is used to monitor activity relating to access(es) of a memory address. The redundancy records are created and/or maintained by the runtime analysis tool and/or code inserted into a computer program under test by such a tool. Accordingly, each redundancy record can be associated with a particular memory address.

Examples of the attributes maintained by a redundancy record can include, but are not limited to, the virtual memory address that is accessed, the value of the program counter, which is a pointer to the current instruction as of the time of access to the memory location, a count of the number of write accesses that did not change the value at that memory address, a threshold serving as a "high water mark" for the count of write accesses that did not change the value at the memory address, a count of the number of the write accesses that have the same program counter value and that did not change the value at memory addresses, as well as a threshold serving as a "high water mark" for the count of the number of write accesses that have the same program counter value and that did not change the value at memory addresses.

Redundancy records further can include a count of the number of read accesses that did not correspond to write accesses, a count of the number of read accesses that did not correspond to write accesses that have the same program counter, as well as a threshold serving as a "high water mark" for each of these counts. The redundancy records further can include one or more pointers to data representing a call graph for the methods that made the redundant memory accesses.

In one embodiment, the runtime analysis tool can execute in conjunction with the computer program under test. In that case, the runtime analysis tool can execute at the same time as, and cooperatively with, the computer program under test. Accordingly, the runtime analysis tool can intercept read and/or write operations, as the case may be, to track memory access activity as discussed herein.

In another embodiment, the runtime analysis tool can insert within, or instrument, the computer program under test with appropriate code for performing the various steps described herein. In that case, the runtime analysis tool does not actually execute in conjunction with the computer program under test. Rather, the computer program under test executes in a modified form which includes the inserted code from the runtime analysis tool. Still, it can be said that the runtime analysis tool "performs" the various steps described herein.

Figure 1:
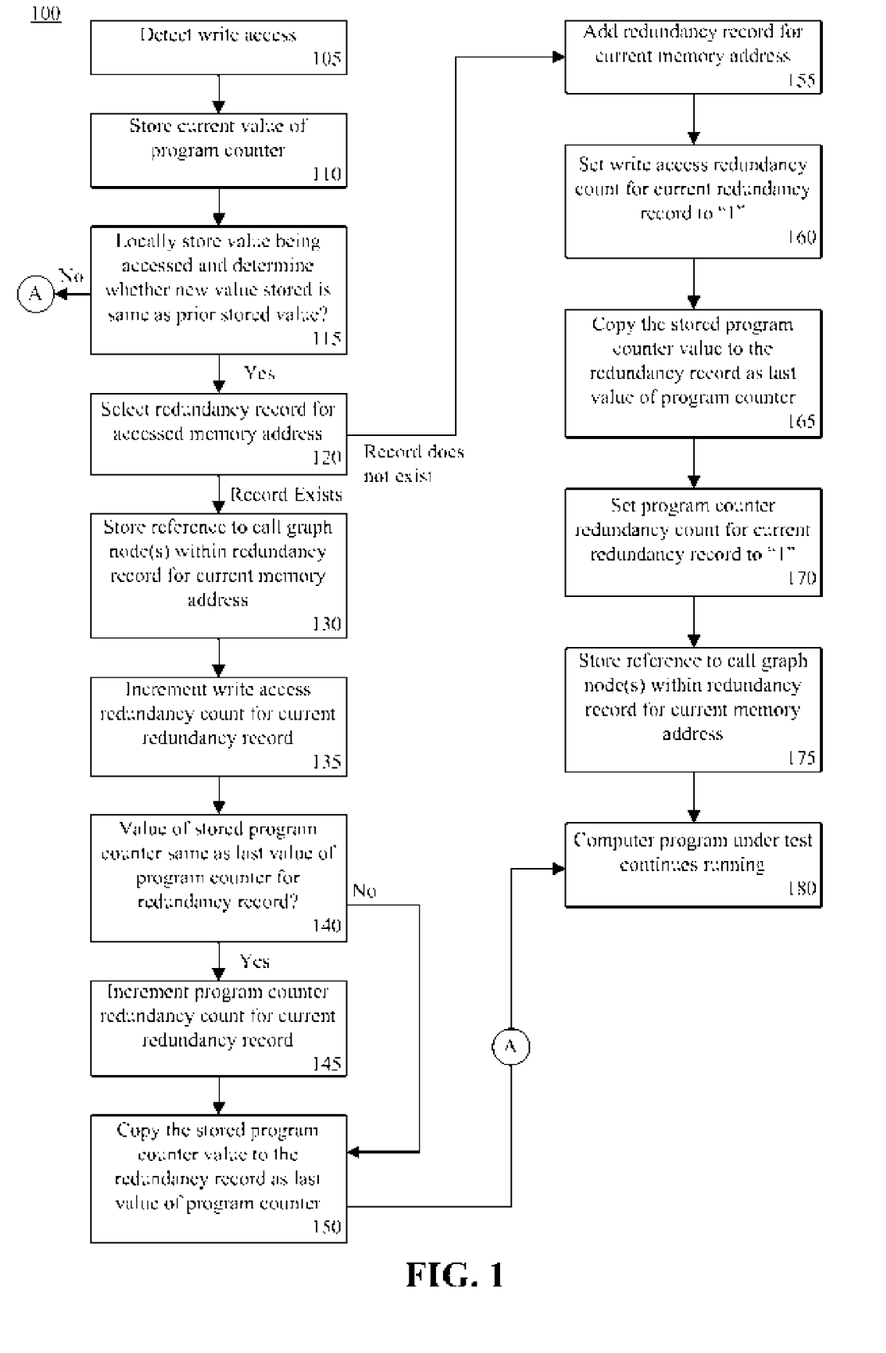
FIG. 1 is a flow chart illustrating a method of identifying portions of computer code responsible for performing redundant computation in accordance with one embodiment of the present invention.

FIG. 1 is a flow chart illustrating a method 100 of identifying portions of computer code responsible for performing redundant computation in accordance with one embodiment of the present invention. Method 100 illustrates an embodiment of the present invention that detects instances of wasteful write accesses where a value is written to a memory address that is the same as the value that was already, or previously, stored in that memory address. Accordingly, method 100 can begin in step 105 where the software analysis tool can begin monitoring for write accesses to memory locations that are performed by the computer program under test during runtime and detect such an access.

In step 110, the current value of the program counter can be stored. In step 115, the contents of the memory address that was accessed can be stored locally. Further, in step 115, a determination can be made by the analysis tool as to whether the new value being stored in the memory address that was accessed is the same as the value that was already stored in the memory address, i.e. prior to the detected write operation. If so, the method can proceed to step 120. If not, the method can proceed to step 180, where the computer program under test continues to execute until such time that another access to a memory address is detected and/or occurs.

Continuing with step 120, the redundancy record for the accessed, or current, memory address can be selected. If a redundancy record for the current memory address does exist, the method can proceed to step 130. If not, the method can continue to step 155. In step 130, a reference to the call graph node(s) associated with the program counter value stored in step 110 can be stored in the current redundancy record.

In step 135, a write access redundancy count for the current redundancy record, and thus the current memory address, can be incremented. The write access redundancy count can be a count of the number of write accesses that did not change the value at the target memory address. Because each redundancy record can maintain such a count, each memory address may have an associated count.

In step 140, a determination can be made as to whether the value of the program counter stored in step 110 is the same as the prior value of the program counter, for example the program counter value that was previously stored in the current redundancy record. That is, the current value of the program counter can be compared with the value of the program counter that was stored during the last time the method tracked through the branch including step 140. If so, the method can proceed to step 145 where a counter that tracks the number of write accesses that have a matching program counter value and that did not change the value at the target memory address is incremented. If not, the method can continue to step 150. In step 150, the value of the program counter stored in step 110 can be copied into the current redundancy record to be used in subsequent program counter comparisons. After step 150, the method can proceed to step 180, where the computer program under test continues to execute.

Continuing with step 155, in the case where no redundancy record exists for the current memory address, a redundancy record for the current memory address can be added and/or created. In step 160, the write access redundancy count for the current redundancy record can be set and/or initialized to "1". In step 165, the value of the program counter stored in step 110 can be copied into the current redundancy record to be used in subsequent program counter comparisons. In step 170, the program counter redundancy count for the current redundancy record can be set and/or initialized to "1". In step 175, a reference to the call graph node(s) associated with the program counter value stored in step 110 can be stored in the current redundancy record. In step 180, the computer program under test can continue to run.

Figure 2:
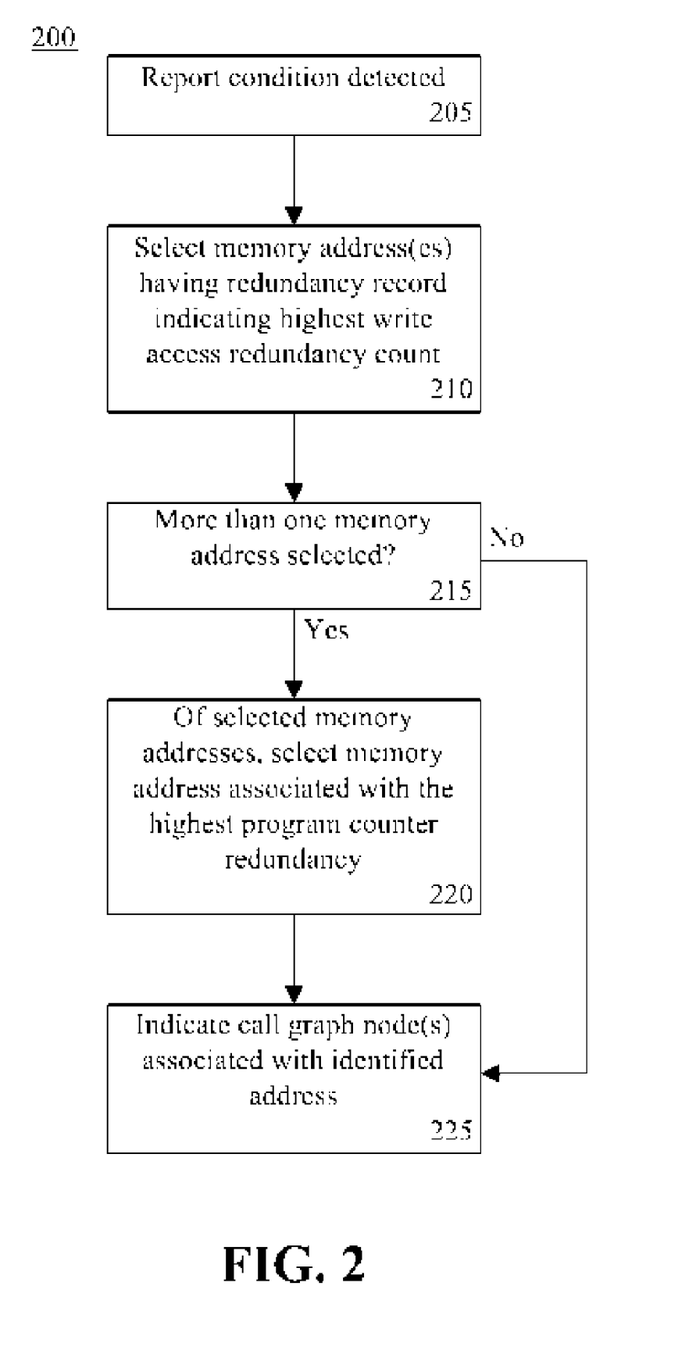
FIG. 2 is a flow chart illustrating a method of indicating portions of computer code responsible for performing redundant computation in accordance with one embodiment of the present invention.

FIG. 2 is a flow chart illustrating a method 200 of indicating portions of computer code responsible for performing redundant computation in accordance with one embodiment of the present invention. Method 200 can provide results determined from implementation of the method illustrated in FIG. 1. As such, it can be performed upon detection of a report condition. A report condition can be any of a variety of conditions which indicate that results from monitoring accesses to memory addresses are to be provided in one form or another. For example, such conditions can include, but are not limited to, termination of the computer program under test, a user request for report data, a count exceeding a threshold, whether that threshold is determined by the analysis tool or specified by the user, or the like.

In step 205, a report condition can be detected. In step 210, the address(es) having a redundancy record indicating the highest write access redundancy count can be selected. In step 215, a determination can be made as to whether more than one address was selected. If so, the method can proceed to step 220. If not, the method can continue to step 225. In step 220, of the memory addresses selected in step 210, a subset of such memory address(es) having a redundancy record specifying the highest program counter redundancy can be selected. Other memory addresses originally selected in step 210, but not included in the subset defined in step 220 can be deselected.

In step 225, the portions of code responsible for accessing the selected memory address(es) can be indicated. For example, in one embodiment, the call graph nodes corresponding to the responsible portions of code can be highlighted or otherwise indicated to the user. Such information can be obtained from the redundancy records corresponding to the selected memory address(es).

Figure 3:
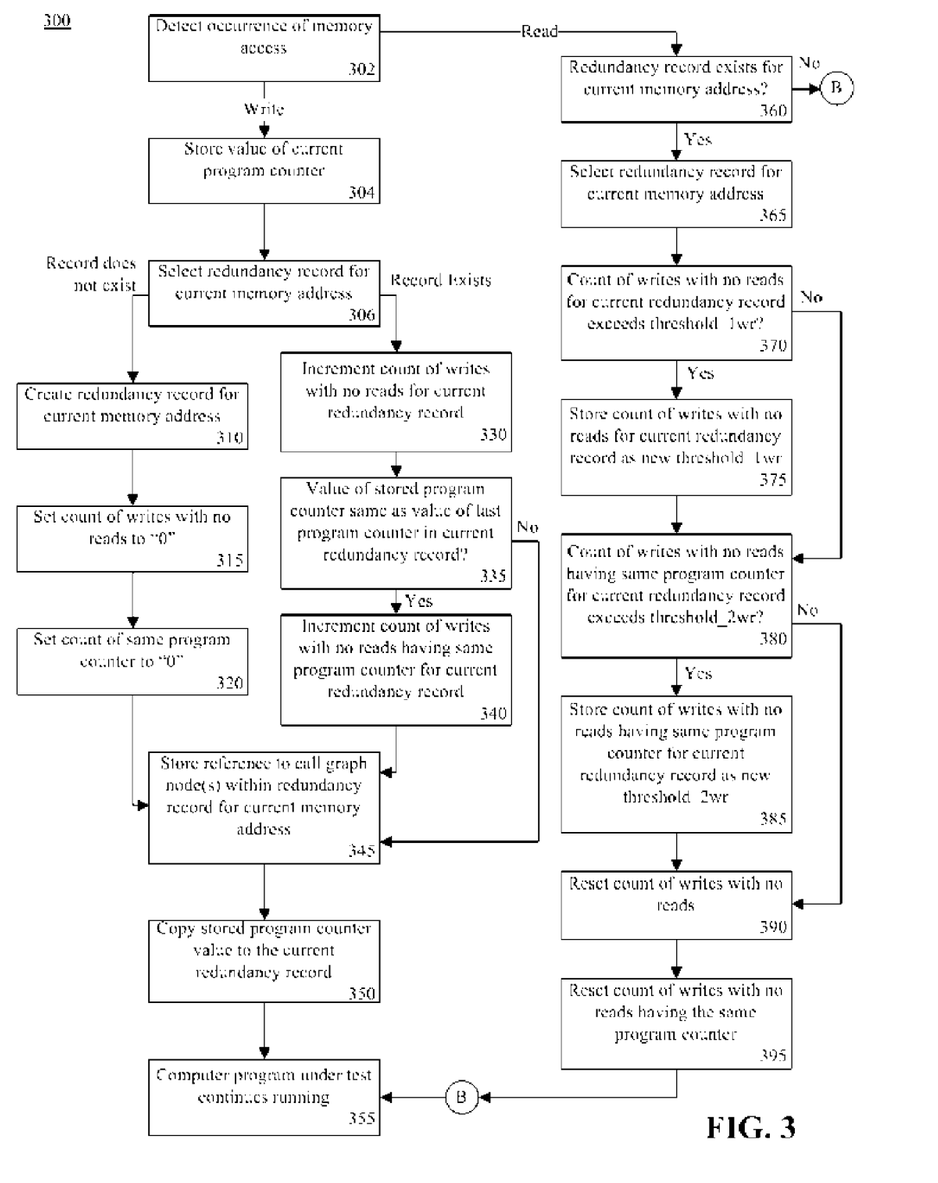
FIG. 3 is a flow chart illustrating a method of identifying portions of computer code responsible for performing redundant computation in accordance with another embodiment of the present invention.

FIG. 3 is a flow chart illustrating a method 300 of identifying portions of computer code responsible for performing redundant computation in accordance with another embodiment of the present invention. Method 300 can detect instances in which values have been written to memory addresses without intervening read accesses of those memory addresses. Accordingly, method 300 can begin in step 302 where the occurrence of a memory access, whether a read or a write, has been detected. If the access is a write, the method can proceed to step 304. If the access is a read, the method can continue to step 360.

In step 304, the value of the current program counter can be stored. In step 306, the redundancy record for the current memory address, i.e. the memory address that was accessed as detected in step 302, can be selected. If no redundancy record exists for the current memory address, the method can proceed to step 310. If a redundancy record does exist, the method can proceed to step 330.

Continuing with step 310, in the case where a redundancy record does not exist for the current memory address, a redundancy record can be created. A count of writes with no corresponding reads can be set and/or initialized to "0" in step 315. In step 320, a count of writes with no corresponding reads that have a matching program counter value can be set and/or initialized to "0".

In step 330, in the case where a redundancy record does exist for the current memory address, the count of writes with no corresponding reads can be incremented. In step 335, a determination can be made as to whether the value of the program counter stored in step 304 is the same as the previous value of the program counter, i.e. the program counter stored in the current redundancy record. If so, the method can continue to step 340 where a counter of writes with no corresponding reads that have the same program counter value can be incremented.

Continuing from either step 320 or step 340, in step 345, a reference to the call graph node(s) associated with the program counter value stored in step 304 can be stored in the current redundancy record. In step 350, the value of the program counter stored in step 304 can be copied into the current redundancy record to be used in subsequent program counter comparisons. In step 355, the computer program under test can continue to run.

In step 360, where the detected memory access in step 302 was a read access, a determination can be made as to whether a redundancy record exists for the current memory address. If not, the method can continue to step 355 where the computer program under test continues to execute. If a redundancy record does exist, that redundancy record can be selected in step 365.

In step 370, a determination can be made as to whether the count of writes with no corresponding reads exceeds a threshold value, referred to as threshold_1wr. The value of threshold_1wr can be established as the "high water mark", meaning a marker or indication of the highest count of write accesses with no corresponding read accesses of each redundancy record. If the count exceeds threshold_1wr, the value of the count of writes with no reads can be stored as the new value of threshold_1wr in step 375. If not, the method can proceed to step 380.

In step 380, a determination can be made as to whether the count of writes with no corresponding reads having a matching program counter value exceeds a threshold value referred to as threshold_2wr. The value of threshold_2wr can be established as a "high water mark" in that it is a marker or indication of the highest count of writes with no corresponding reads that have the same program counter value for a particular redundancy record. Thus, if the count of writes with no corresponding reads that have a matching program counter value exceeds the value of threshold_2wr, that count can be stored as the new value of threshold_2wr in step 385.

After step 380 or step 385, the counter for writes with no corresponding reads can be reset and/or initialized to "0" in step 390. In step 395, the count of writes with no reads that have the same program counter value also can be reset and/or initialized to "0".

Figure 4:
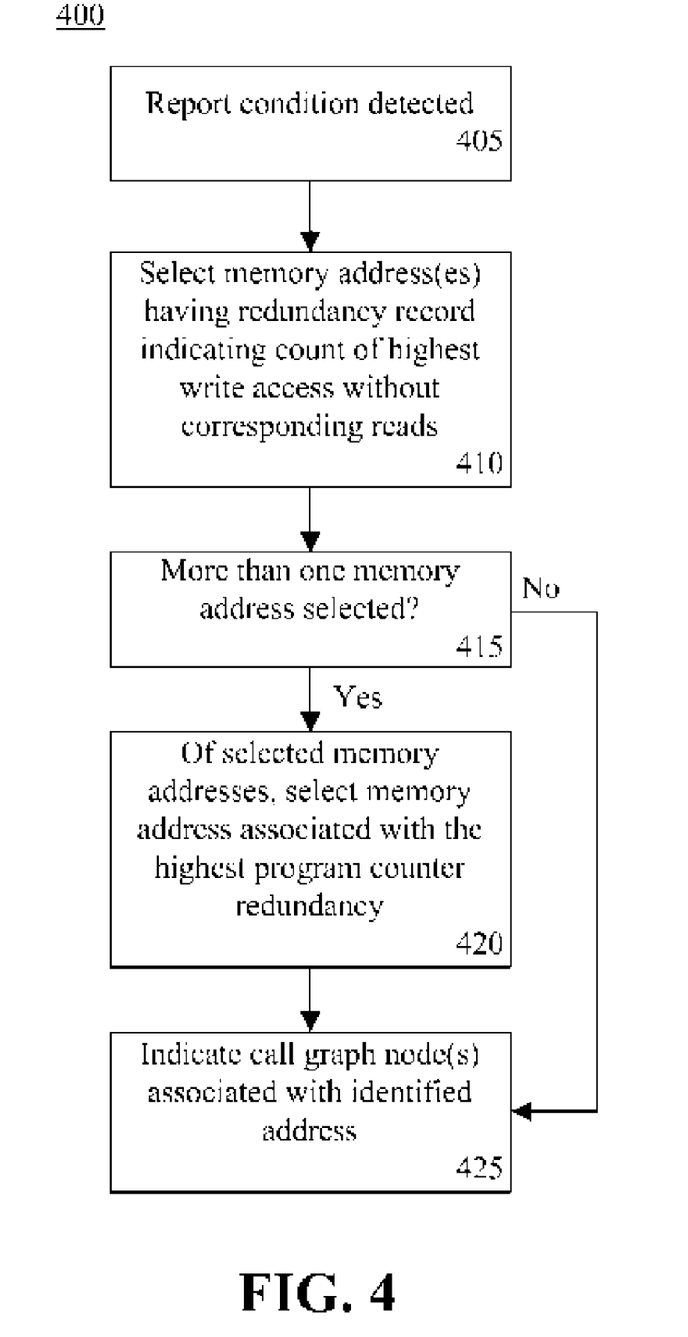
FIG. 4 is a flow chart illustrating a method of indicating portions of computer code responsible for performing redundant computation in accordance with another embodiment of the present invention.

FIG. 4 is a flow chart illustrating a method 400 of indicating portions of computer code responsible for performing redundant computation in accordance with another embodiment of the present invention. Method 400 can provide results determined from implementation of the method illustrated in FIG. 3, for example in response to the detection of a report condition.

Thus, in step 405 a report condition can be detected. In step 410, the address(es) having a redundancy record indicating the highest count of writes without corresponding reads can be selected. In step 415, a determination can be made as to whether more than one address was selected in step 410. If so, the method can proceed to step 420. If not, the method can continue to step 425. In step 420, of the memory addresses selected in step 410, a subset of those address(es) having the highest program counter redundancy can be selected. Memory addresses originally selected in step 410 that are not included in the subset defined in step 420 can be deselected.

In step 425, the portions of code responsible for accessing the selected memory address(es) can be indicated. As noted, for example, the call graph nodes corresponding to the responsible portions of code can be highlighted or otherwise indicated to the user.

Figure 5:
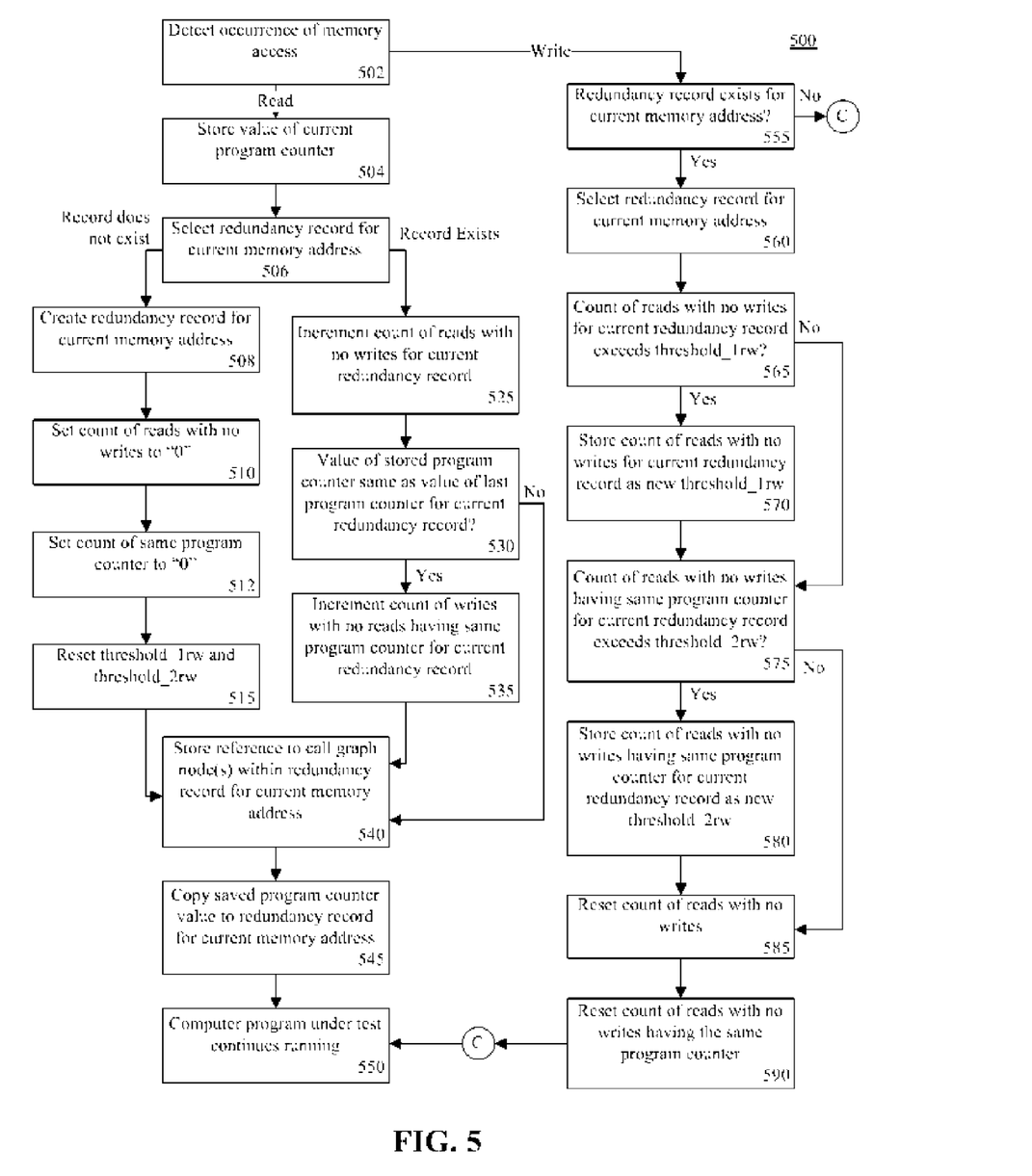
FIG. 5 is a flow chart illustrating a method of identifying portions of computer code responsible for performing redundant computation in accordance with yet another embodiment of the present invention.

FIG. 5 is a flow chart illustrating a method 500 of identifying portions of computer code responsible for performing redundant computation in accordance with yet another embodiment of the present invention. Method 500 can detect instances in which values have been read from a memory address multiple times without intervening write operations. This condition indicates that a read operation has been performed only to read an unchanged value from a memory address. Accordingly, method 500 can begin in step 502 where the occurrence of a memory access, whether a read or a write, has been detected. If the access is a read, the method can proceed to step 504. If the access is a write, the method can continue to step 555.

In step 504, the value of the current program counter can be stored. In step 506, a redundancy record for the current memory address, i.e. the memory address that was accessed as detected in step 502, can be selected. If no redundancy record exists for the current memory address, the method can proceed to step 508. If a redundancy record does exist, the method can proceed to step 525.

Continuing with step 508, in the case where a redundancy record does not exist for the current memory address, a redundancy record can be created. A count of reads with no corresponding writes can be set and/or initialized to "0" in step 510. In step 512, a count of reads with no corresponding writes having a matching program counter value can be set and/or initialized to "0". In step 515, a threshold value, referred to as threshold_1rw, of reads with no corresponding writes can be set and/or initialized to "0". The value of threshold_1rw can be established as the "high water mark" or the highest count of read accesses with no corresponding write accesses of each redundancy record. Similarly, a threshold of reads with no corresponding writes having a same program counter value, referred to as threshold_2rw, can be set and/or initialized to "0". Threshold_2rw can serve as a "high water mark" for the highest count of read accesses with no corresponding write accesses having a same program counter value.

In step 525, in the case where a redundancy record does exist for the current memory address, the count of reads with no corresponding writes within the current redundancy record can be incremented. In step 530, a determination can be made as to whether the program counter value stored in step 504 is the same as the previous value of the program counter stored in the current redundancy record. If so, the method can continue to step 535 where a counter of reads with no corresponding writes that have the same program counter can be incremented.

Continuing with step 540 from either step 515 or step 535, a reference to the call graph node(s) associated with the program counter value stored in step 504 can be stored in the current redundancy record. In step 545, the value of the program counter stored in step 504 can be copied into the current redundancy record to be used in subsequent program counter comparisons. In step 550, the computer program under test can continue to run.

In step 555, where the detected memory access in step 502 was a write access, a determination can be made as to whether a redundancy record exists for the current memory address. If not, the method can proceed to step 550 to continue to run. If a redundancy record does exist, the redundancy record can be selected as the current redundancy record in step 560. In step 565, a determination can be made as to whether the count of reads with no corresponding writes exceeds the current value of threshold_1rw. If so, the value of the count of reads with no writes can be stored as the new value of threshold_1rw in step 570. If not, the method can proceed to step 575.

In step 575, a determination can be made as to whether the count of reads with no corresponding writes having a matching program counter value exceeds the current value of threshold_2rw. If so, the count of reads with no corresponding writes can be stored as the new value of threshold_2rw in step 580. After either of steps 575 or 580, the method can proceed to step 585 where the counter for reads with no corresponding writes can be set and/or initialized to "0". In step 590, the counter for reads with no corresponding writes that have a matching program counter value can be reset and/or initialized to "0". After step 590, the method can proceed to step 550.

Figure 6:
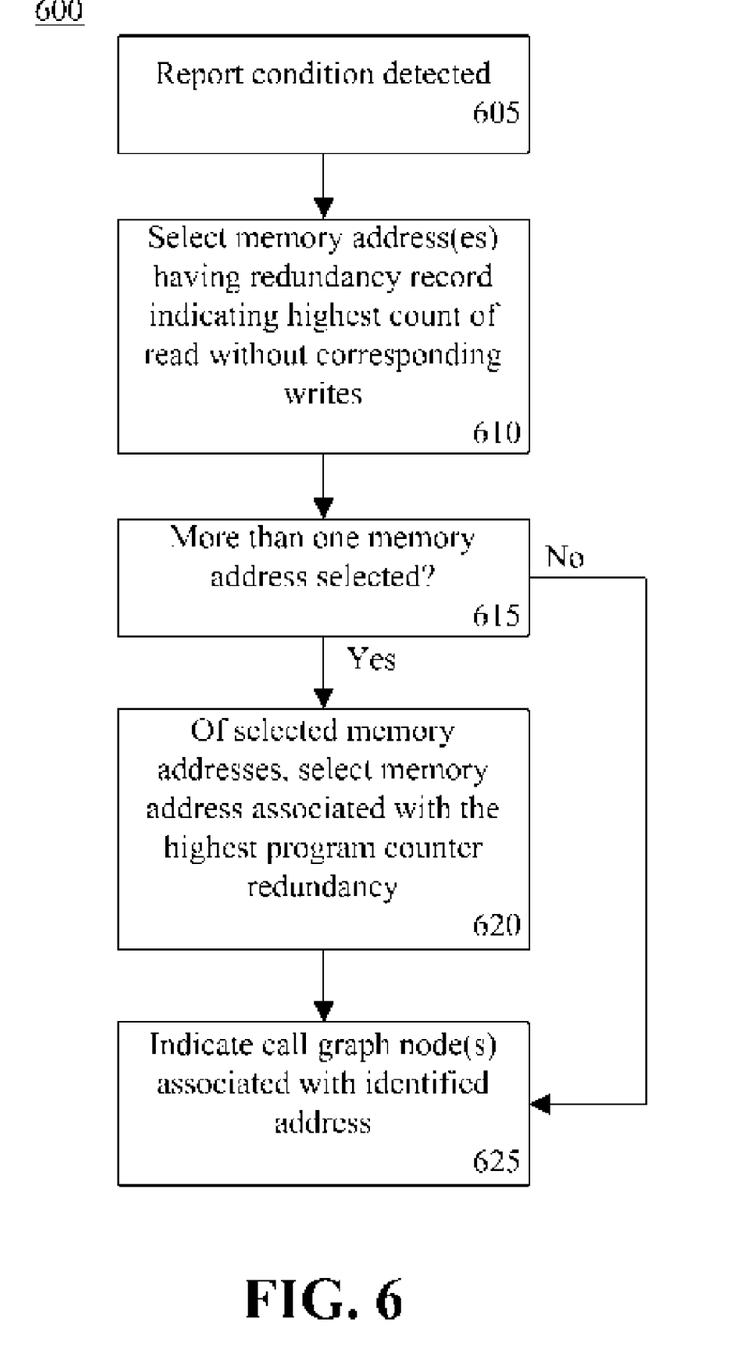
FIG. 6 is a flow chart illustrating a method of indicating portions of computer code responsible for performing redundant computation in accordance with yet another embodiment of the present invention.

FIG. 6 is a flow chart illustrating a method 600 of indicating portions of computer code responsible for performing redundant computation in accordance with yet another embodiment of the present invention. Method 600 can provide results determined from implementation of the method illustrated in FIG. 5, for example in response to the detection of a report condition.

Thus, in step 605, a report condition can be detected. In step 610, the address(es) having a redundancy record indicating the highest count of reads without corresponding writes can be selected. In step 615, a determination can be made as to whether more than one memory address was selected in step 610. If so, the method can proceed to step 620. If not, the method can continue to step 6250. In step 620, of the memory addresses selected in step 610, a subset of such memory address(es) that have a highest program counter redundancy can be selected. Memory addresses originally selected in step 610 that are not included in the subset defined in step 620 can be deselected.

In step 625, the portions of code responsible for accessing the selected memory address(es) can be indicated. As noted, for example, the call graph nodes corresponding to the responsible portions of code can be highlighted or otherwise indicated to the user.

The embodiments disclosed herein and discussed with reference to FIGS. 1-6 illustrate various techniques for identifying portions of code that are responsible for unnecessary processing and/or computation within computer programs. The details and steps described herein are provided for purposes of illustration and are not intended to limit the present invention in any way. For example, it should be appreciated that in another embodiment, portions of code responsible for a number of instances of redundant processing that exceeds a user specified threshold can be identified. In such an embodiment, a plurality of portions of code can be identified rather than a portion of code responsible for the largest number of instances of redundant processing. Other variations also are within the scope of the present invention such as varying the conditions upon which report information is provided to a user.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of runtime analysis of a computer program comprising:
    after each access of a first type to a memory address, incrementing a counter associated with the memory address;
    after each access of a second type to the memory address, comparing the count of the counter associated with the memory address with a threshold value and resetting the counter, wherein the count of the counter represents a count of consecutive accesses of the first type prior to an access of the second type;
    determining that the count of the counter associated with the memory address exceeds the threshold value;
    determining a portion of code of the computer program responsible for accessing the memory address associated with the counter that exceeds the threshold value; and
    designating the portion of code as responsible for redundant accesses to the memory address.

2. The method of claim 1, further comprising if the count of the counter exceeds the threshold value, storing the count of the counter as a new threshold value for subsequent comparisons and resetting the counter.

3. The method of claim 1, wherein the access of the first type is a write access, the access of the second type is a read access, and the counter stores a count of write accesses with no corresponding read accesses.

4. The method of claim 1, wherein the access of the first type is a read access, the access of the second type is a write access, and the counter stores a count of read accesses with no corresponding write accesses.

5. The method of claim 1, further comprising, for each access of the first type, storing a current value of a program counter.

6. The method of claim 5, further comprising:
    comparing the current value of the program counter with a prior value of the program counter; and
    incrementing a count of a redundant program counter for the memory address accessed by the access of the first type if the current value of the program counter is equal to the prior value of the program counter.

7. The method of claim 6, further comprising identifying a portion of code responsible for accessing the memory address that is associated with a redundant program counter having a highest count of all redundant program counters.

8. A machine readable storage having a plurality of code sections for causing a machine to perform runtime analysis of a computer program, said machine readable storage comprising:
    code for comparing a value previously stored in a memory address with a value that is written to the memory address for each write access to the memory address, and if the value previously stored is a same value as the value that is written, incrementing a counter associated with the memory address, wherein the count of the counter represents a count of consecutive write accesses of the same value to the memory address; and
    code for determining a portion of code of the computer program under runtime analysis that is responsible for accessing the memory address having an associated counter that conforms with an established criterion, and designating the portion of code as responsible for redundant write accesses to the memory address.

9. The machine readable storage of claim 8, wherein the established criterion is whether the count of the counter for the memory address exceeds a threshold value.

10. The machine readable storage of claim 9, further comprising code for storing the count of the counter as a new threshold value for subsequent comparisons if the count of the counter exceeds the threshold value.

11. The machine readable storage of claim 8, further comprising:
   code for, if the value previously stored is equal to the value that is written, first determining whether a redundancy record exists for the memory address that is accessed; and
   code for, if no redundancy record exists, creating a redundancy record for the memory address that is accessed.

12. The machine readable storage of claim 8, further comprising code for storing a value of a program counter for each instance in which the value previously stored is equal to the value that is written to the memory address.

13. The machine readable storage of claim 12, further comprising code for comparing a current value of the program counter with a prior value of the program counter, and incrementing a count of a redundant program counter if the current value of the program counter is equal to the prior value of the program counter.

14. The machine readable storage of claim 13, further comprising code for determining a portion of code responsible for accessing the memory address that is associated with a redundant program counter that conforms to a different established criterion.

15. A machine readable storage having a plurality of code sections for causing a machine to perform runtime analysis of a computer program, said machine readable storage comprising:
   code for, after each access of a first type to a memory address, incrementing a counter associated with the memory address;
   code for, after each access of a second type to the memory address, comparing the count of the counter associated with the memory address with a threshold value and resetting the counter, wherein the count of the counter represents a count of consecutive accesses of the first type prior to an access of the second type;
   code for determining that the count of the counter associated with the memory address exceeds the threshold value;
   code for determining a portion of code of the computer program under runtime analysis that is responsible for accessing the memory address associated with the counter that exceeds the threshold value; and
   code for designating the portion of code as responsible for redundant accesses to the memory address.

16. The machine readable storage of claim 15, further comprising code for, if the count of the counter exceeds the threshold value, storing the count of the counter as a new threshold value for subsequent comparisons and resetting the counter.

17. The machine readable storage of claim 15, wherein the access of the first type is a write access, the access of the second type is a read access, and the counter stores a count of write accesses with no corresponding read accesses.

18. The machine readable storage of claim 15, wherein the access of the first type is a read access, the access of the second type is a write access, and the counter stores a count of read accesses with no corresponding write accesses.

19. The machine readable storage of claim 15, further comprising:
   code for, for each access of the first type, storing a current value of the program counter;
   code for comparing the current value of a program counter with a prior value of the program counter; and
   code for incrementing a count of a redundant program counter if the current value of the program counter is equal to the prior value of the program counter.

20. The machine readable storage of claim 19, further comprising code for identifying a portion of code responsible for accessing the memory address that is associated with a redundant program counter having a highest count of all redundant program counters.

* * * * *